(12) United States Patent
Young

(10) Patent No.: US 6,384,123 B1
(45) Date of Patent: May 7, 2002

(54) THERMOPLASTIC ELASTOMER FILM COMPOSITION

(75) Inventor: Robert E. Young, Marietta, OH (US)

(73) Assignee: RJF International Corporation, Fairlawn, OH (US)

( * ) Notice: Subject to any disclaimer, the term of this patent is extended or adjusted under 35 U.S.C. 154(b) by 0 days.

(21) Appl. No.: 09/616,306

(22) Filed: Jul. 14, 2000

(51) Int. Cl.⁷ .............................. C08K 3/34; C08K 3/26; C08K 3/40

(52) U.S. Cl. ................... 524/451; 524/425; 524/434; 524/449; 524/494

(58) Field of Search .................... 524/434, 425, 524/449, 451, 494

(56) References Cited

U.S. PATENT DOCUMENTS

| | | |
|---|---|---|
| 5,576,374 A | 11/1996 | Betso et al. |
| 5,750,600 A | 5/1998 | Nokozido et al. |
| 5,763,534 A | 6/1998 | Srinivasan et al. |
| 5,773,515 A | 6/1998 | Srinivasan et al. |
| 5,783,629 A | 7/1998 | Srinivasan et al. |
| 5,834,381 A | 11/1998 | Roe et al. |
| 5,985,971 A | 11/1999 | Srinivasan et al. |
| 5,998,524 A | 12/1999 | Srinivasan et al. |

*Primary Examiner*—Kriellion A. Sanders
(74) *Attorney, Agent, or Firm*—George W. Moxon, II; Brouse McDowell

(57) ABSTRACT

A thermoplastic elastomer composition for use in automotive interiors, wallcoverings, upholstery, advertising banners and films and tenting which comprises a major amount of a thermoplastic elastomer or elastomers having a weight average melt index of less than 6, a minor amount of polyolefin, a minor amount of a polymeric elastomer and a filler material.

29 Claims, No Drawings

THERMOPLASTIC ELASTOMER FILM COMPOSITION

BACKGROUND OF THE INVENTION

The present invention is related to a thermoplastic elastomer film composition for use in forming films for use in automotive interiors, wallcoverings, upholstery, advertising films, and tenting materials.

Thermoplastic elastomer compositions are known for their rubbery characteristics and frequently are used to modify polyolefin compositions, such as polyethylene and polypropylene. Often these thermoplastic elastomers are copolymers of ethylene and olefins, such as butene or octene, which are produced with metallocene or Kaminsky catalysts. One example of a polyolefin/thermoplastic elastomer blends are U.S. Pat. No. 5,998,524 to Srinivasan et al (and related U.S. Pat. Nos. 5,763,534; 5,773,515; 5,703,629; and 5,985,971), which disclose a composition having a majority of polyolefin, modified by the elastomeric component. Another example is U.S. Pat. No. 5,834,381 to Roe et al, which discloses a rubber (i.e., an elastomer) modified polypropylene which is 10 mils in thickness and is laminated to a scrim for use as auto security shades or covers. U.S. Pat. No. 5,576,374 to Betso et al discloses a polyolefin combined with a thermoplastic elastomer for use in filled composites and to make molded parts. U.S. Pat. No. 5,750,600 to Nozokido et al discloses an oil-extended olefin thermoplastic elastomer composition for use in skins of interior automotive trim. The Nozokido composition has a majority of elastomer (i.e., 50 to 70%) and 30 to 50% of a combination of polypropylene resins having different crystal melting points and is used to make sheets having a thickness of 0.25 to 0.45 mm. As noted in Nozokido, when the elastomer content is higher than 70% by weight, problems in manufacturing are encountered and vacuum forming suffers.

SUMMARY OF THE INVENTION

The present invention has resulted from the discovery that a composition which comprises a major amount of a thermoplastic elastomer or a blend of thermoplastic elastomers having an average melt index of less than 6, a minor amount (i.e., less than 30% by weight) of polyolefin, a minor amount of polymeric elastomer (i.e., less than 30% by weight), and a filler material results in a thermoplastic elastomer film composition which is useful for automotive interiors, wallcoverings, upholstery, advertising films or banners, and tenting. The composition is processable by calendering to make films having a thickness of less than 10 mils. The film can then be handled to be combined with other films or to be bonded to other support materials such as scrim fabrics.

DETAILED DESCRIPTION OF THE INVENTION

The thermoplastic elastomer composition for use in automotive interiors, wallcoverings, upholstery, advertising banners, and tenting comprises a major amount of a thermoplastic elastomer or a blend of thermoplastic elastomers having an average melt index of less than 6, a minor amount of a polyolefin and a polymeric elastomer (i.e., less than 30% by weight), and a filler material.

The thermoplastic elastomer (or "TPE") can be any copolymer of ethylene and a $C_3$ to $C_8$ olefin produced with a metallocene or Kaminsky catalyst (or "single site") catalysts and having a molecular weight distribution (Mw/Mn) of less than or equal to 3 is contemplated for use as this component. Examples are copolymers of ethylene and butene, copolymers of ethylene and hexene and copolymers of ethylene and octene. It is preferred that the TPE is a mixture of TPE's, where the TPE's have different melt indexes with one being higher than the other, but with the weighted average melt index being less than 6, less than 3 and less than 2 being also preferred. Examples of TPEs are the Exact® polymers from Exxon Mobil Chemical. The TPE will be present in a majority amount of from 50% by weight to about 95% by weight based upon the weight of all of the polymers. Preferably, the TPE is more than 60% by weight, with more than 80% by weight being further preferred.

The polyolefin resin can be a polyethylene or a polypropylene, but is preferably a general purpose homopolymer polypropylene. The polypropylene resin for use in the preparation of the olefin thermoplastic elastomer composition according to the present invention is a crystalline propylene resin having a crystal melting point of 140° C. to 165° C., preferably, 150° C. to 156° C. and an ethylene unit content of 1 to 2% by weight, preferably, 1.2 to 1.6% by weight. The characteristics of the polyolefin are not critical, but the amount of polyolefin will preferably be less than 30% by weight of the total polymeric composition, usually be about 1% to 30% by weight with up to 20% by weight and up to 10% by weight being further preferred.

The "polymeric elastomer" is a rubbery elastomer which will provide improved tear and elongation at break in the TPE composition and is preferred to be one of, but not limited to, a styrene-ethylene-butylene or "SEB" rubber with a Shore "A" hardness of 60 to 80, and a solution (25% weight in toluene viscosity of 6,000 to 9,000 CPS), a non-vulcanized chlorinated polyethylene with a chlorine content of between 30 and 42%, and a mooney viscosity (MS 1+4 121C) of between 42 and 94; and an (ethylene/vinyl acetate) copolymer or (ethylene/carbon monoxide) copolymer with a melt flow index of between 8 and 100 and a crystalline melt temperature of between 59 and 70° C. Examples of polymeric elastomers are Kraton® G-1650 thermoplastic rubber, which is a styrene-ethylene-butylene block copolymer, Elvaloy® HP511 resin from duPont, which is an ethylene vinyl acetate copolymer, and Tyrin 3615 from duPont Dow Elastomers, which is a chlorinated polyethylene. The polymeric elastomer will be present in a minor amount, about 1% to 30% by weight based upon the total weight of the polymers, preferably up to 20% by weight, with up to 10% by weight being further preferred.

The TPE composition of the present invention is achieved using processing equipment, which is typical for such materials. For example, in the preferred process, the ingredients will be weighed, pre-blended, mixed in a Banbury mixer, then passed through two 2-roll mills, a strainer extruder, and finally, calendered on an inverted "L" calender. There is no criticality in the equipment as long as it effectively mixes the composition and produces a thin film having an appropriate surface finish. It is preferred that the olefin thermoplastic elastomer composition for use in the present invention be prepared by blending together the components without the formation of crosslinking, from the viewpoint of formability at the final calendering and workability at lamination and/or vacuum forming.

For example, the thermoplastic elastomer composition can be prepared by preparing specified amounts of the ethylene/alpha-olefin copolymer elastomer and the polypropylene resin, charging them into an agitation mixer such as Henschel mixer (trade name), a supermixer or a tumbler mixer and effecting agitation blending generally for 1 to 10 min. In particular, while the use of the tumbler mixer takes about 10 min, the supermixer advantageously enables preparing the desired composition by agitation blending within about 3 min. According to necessity, the olefin thermoplastic elastomer composition can be melt kneaded by the use of a screw extruder or the like generally at 170° C. to 250° C., preferably, 210° C. to 230° C. and thereafter pellet When a composition comprising a polypropylene resin having an ethylene unit content of much greater than 2% by weight is sheeted and subjected to postforming, for example, by embossing and vacuum forming, the problems are encountered such that the composition sticks to the embossing rolls at the time of postforming embossing and that the emboss disappears at the time of subsequent vacuum forming. On the other hand, when a composition comprising a polypropylene resin having an ethylene unit content of far lower than 0.5% by weight is sheeted, the problem encountered is that breakage of the postformed article often occurs at the time of vacuum forming. The polypropylene resin may be a resin composition having an ethylene unit content of 1–2% by weight, preferably 1.2–1.6% by weight which preferably comprises a crystalline propylene/ethylene random copolymer or crystalline propylene homopolymer, and a propylene/ethylene random copolymer having an ethylene unite content of 0.5 to 4% by weight. Although the melt flow rate of the polypropylene resin is not particularly limited, it is generally preferred that the melt flow rate or MFR (@ 230° C. and 2.16 kgf) range from 1 to 50 g/10 min, especially, 5 to 10 g/10 min.

Although the mineral oil for use in the present invention is not particularly limited, the use of high-boiling-point oil fractions such as paraffinic, naphthenic and aromatic mineral oils is preferred from the viewpoint of not only the capability of improving the primary formability at calendering but also the capability of enhancing the mechanical properties of obtained shaped items suitable from the viewpoint of the hue and odor. In this oil-extended thermoplastic elastomer composition, 0 to 30 parts by weight, preferably, 15 to 25 parts by weight of naphthenic oil is contained per 100 parts by weight of the thermoplastic elastomer composition, i.e., the total amount of the TPE, the polyolefin, and the polymeric elastomer.

The choice of the polymeric elastomer is dependent on the final physical properties desired, which can include tensile strength, % extensibility, flammability, and cold temperature performance. Modifications would need to be made to the formula to allow for processing differences. Chlorinated polyethylene, in particular, would have to be used with a reduced amount of paraffinic, napthenic and aromatic oil or excessive sticking to heated processing rolls would be encountered.

The filler materials can be any of those normally used with film forming plastics. The thermoplastic elastomer composition of the present invention may be loaded with various additives and fillers in amounts not detrimental to the objects of the present invention. Examples of such other additives include antioxidants, antistatic agents, ultraviolet absorbers, age resistors and pigments. The filler will be present in an amount of about 5% to about 50% by weight based upon the weight of the polymers, i.e., the weight of the TPE plus the polyolefin plus the polymeric elastomer. Amounts of less than 40%, 30%, 20%, and 10% by weight are preferred.

The composition can include useful additives including for example, process stabilizers, antioxidants, ultraviolet absorbers, soap, such as metal soaps, anti-static agents, lubricants, nucleating agents, pigments, and dispersants for pigments.

In the calendering of the nonflammable olefin thermoplastic elastomer composition for use in making films in accordance with the present invention, the lubricant for use in the present invention imparts fluidity to the molten thermoplastic elastomer composition while maintaining a certain degree of compatibility therewith, so that the frictional resistance on the roll surface is reduced. This prevents the sticking of the composition to rolls and facilitates the forming of the composition. Examples of the lubricants exerting the above functions include higher paraffinic hydrocarbons; higher fatty acid compounds such as higher fatty acids, metal salts of higher fatty acid, higher fatty acid amides and alkyl esters of higher fatty acid (e.g., esters of higher fatty acids and aliphatic monohydric or polyhydric alcohols); higher aliphatic alcohols; polyethers; aromatic carboxylic acid compounds such as phthalic acid diamides and phthalic acid esters; diamine/carboxylic acid condensates; silicones (silicon resin); natural and synthetic rosin; and composite lubricants composed of at least two thereof. Specific examples of the above lubricants include paraffin wax, polyethylene wax, montan wax and hardened castor oil, such as the higher paraffinic hydrocarbon; stearic, palmitic, lauric and oleic acids as the higher fatty acid; magnesium, calcium, aluminum and zinc stearates as the metal salt of higher fatty acid; stearamide, oleamide, lauramide, ethylenebisstearamide, ethylenebislauramide and stearoleamide as the higher fatty acid amide; butyl stearate, ethylene glycol monostearate and glycerol distearate as the alkyl ester of higher fatty acid; stearyl, palmityl, oleyl and lauryl alcohols as the higher aliphatic alcohol; ethylene oxide/propylene oxide copolymer as the polyether; bis(2-ethylhexyl)phthalate as the phthalic acid ester; xylylenediamine/aliphatic carboxylic acid condensates (wax: for example, having approximately 1,000 of average molecular weight) as the diamine/carboxylic acid condensate; and polydimethylsiloxane as the silicone. These lubricants may be used either individually or in combination.

In the sheeting by calendering and postforming by vacuum forming, the use of a composition in which the amount of added lubricant is far smaller than 0.1 part by weight encounters the problem that excessive sticking of the composition to calender rolls occurs. On the other hand, when the amount of added lubricant is far larger than 3 parts by weight, problems are encountered. Not only does the lubricant migrate to the sheet surface during or after the forming with the result that winding of the composition around the calender rolls is often unsatisfactory during calendering, but also the produced sheet has poor coatability and/or a poor appearance.

A vital component to calendering films under 0.010 inches (0.25 mm) is having a wide processing window; a narrow processing window precludes the physical handling of film on the calender and calender train rolls; materials such as flexible and rigid PVC, ABS and various rubber compounds can all be readily calendered as they are classified as having an amorphous molecular structure and thus a wide processing window. Other polymers such as polystyrene, nylon, polyethylene, polypropylene, are classified as having a crystalline molecular structure and thus a narrow processing window. These types of polymers are processable by extrusion, injection molding and blow molding.

The key to the present invention is the choice of thermoplastic elastomer to simulate the processing window of flexible PVC. These unique materials allow the calendering of thin gauge films.

The formulations disclosed within the terms of the present invention may also comprise any additives or fillers commonly in usage with the products of the present invention. The following examples are illustrative of the present invention, and should not limit the scope of the invention.

EXAMPLE 1

The composition of the present invention was made by weighing out the ingredients set forth in Table 1. They were then put on a two-roll laboratory mill for 5 minutes to combine the ingredients and produce a film for evaluation. After 5 minutes, the composition was sheeted off the mill and tested for physical properties as set forth in Table 1.

As can be seen, the composition of the present invention produced a film 8 mils thick and capable of handling for purposes of creating composite materials such as by laminating to other films, including supporting scrims and the like.

TABLE I

| Component | Amount (Parts) |
|---|---|
| Exact 4033 thermoplastic elastomer | 66 |
| Kraton G-1651 polymeric elastomer | 40 |
| Polypropylene F-120-F | 8 |
| Alumina Triahydrate | 60 |
| Clay | 10 |
| Shellflex 371 Naphthenic Oil | 35 |
| Araldite GT-7012 Solid Epoxy | 3 |
| TPE Stabilizer Blend (See Table II) | 2 |
| Exact 4049 thermoplastic elastomer | 66 |
| TOTAL | 290 |
| Limiting Oxygen Index (ASTM D-2863) | 22 |
| Gauge | 8 mil |
| ELMENDORF TEAR: (ASTM D-1922) | |
| Lateral | 25 |
| Transverse | 31 |
| TENSILE PROPERTIES: (ASTM D-882) | |
| Machine Direction: | |
| Strength (psi) | 2211 |
| 100% Mod (psi) | 429 |
| % Elongation | 1149 |
| Transverse Direction: | |
| Strength (psi) | 2141 |
| 100% Mod (psi) | 367 |
| % Elongation | 1114 |
| COLD CRACK: | |
| 10 lb. Roller | −90 |
| Masland | −90 |

TABLE II

TPE Stabilizer Blend

| Ingredient | Amount (Parts per Weight) |
|---|---|
| Calcium carbonate | 2 |
| Ultranox 877A | 0.5 |
| Calcium stearate | 1 |
| Tinuvin 770 | 0.3 |
| Tinuvin 327 | 0.3 |
| Viton fluoropolymer | 0.353 |
| Kemamide E Lubricant | 0.2 |

In Example 1 and in the subsequent examples, the identification and source of the ingredients is as follows in Table III.

TABLE III

| Ingredient | Manufacturer |
|---|---|
| Exact 4033 is an ethylene/butene thermoplastic elastomer having a melt index of 0.8 | Exxon Mobil Chemicals |
| Kraton G-1651 SEB polymeric elastomer | Shell Chemical |
| Polypropylene (available as Aristech F-120-F general purpose grade) | Aristech Chemical Company |
| Alumina Trihydrate | Solem |
| Clay (available as Polyfil 40 or 90) | J M Huber Corporation |
| Araldite GT-7012 is a Solid Epoxy | Durr Marketing |
| Exact 4049 is an ethylene/butene thermoplastic elastomer | Exxon Mobil Chemicals |
| Calcium Carbonate | ECC International |
| Ultranox 877A Antioxidant is a 2:1 blend of bis (2,4-di-t-butylphenyl/pentaerythritol diphosphate and octadecyl 3,5 di-tertabutyl-4-hydroxy hydrocinnamate | GE Plastics |
| Calcium Stearate | Reagens S.P.A. |
| Tinuvin 770 Antioxidant is a 2-(3',5'-di-tert-butyl-2'-hydroxyphenyl)-5-chlorobenzotrizole ultraviolet screener | Ciba-Geigy |
| Tinuvin 327 UV Screener is a bix (2,2,6,6-tetramethyl-4-piperridinyl) sebacate antioxidant | Ciba-Geigy |
| Viton is a fluoropolymer | Dow Dupont Elastomers |
| Kemamide E Lubricant is a Erucamide | Witco Corporation |
| Shellflex 371 is a Napthenic oil | Shell Chemical |
| Tyrin 3615P is a chlorinated polyethylene polymeric elastomer | Dow DuPont Elasomers |
| Exact SLP9053 is an ethylene based thermoplastic elastomer | Exxon Mobil Chemicals |
| Exact 4049 is an ethylene/butene thermoplastic elastomer having a melt index of 4.5 | Exxon Mobil Chemicals |
| Elvaloy HP 511 is an ethylene vinyl acetate copolymer | DuPont Industrial Polymers |
| Exact 4023 is an ethylene/butene thermoplastic elastomer having a melt index of 35. | Exxon Mobil Chemicals |

Additional TPE compositions are set forth in Table IV in which various polymeric elastomers are employed. As can be seen from the results, a wide range of tensile properties, Elmendorf tear, and compound hardness (Shore "A") can be achieved by varying the TPE type and content, as well as the Polymeric Elastomer type.

TABLE IV

| Parts by Weight | Example | | | | | | | |
|---|---|---|---|---|---|---|---|---|
| | 2 | 3 | 4 | 5 | 6 | 7 | 8 | 9 |
| Exact 4033 TPE | 110 | 110 | 66 | 132 | | 44 | 88 | 110 |
| Kraton G-1651 SEB Rubber | 40 | 40 | 40 | 40 | 40 | 40 | 40 | 40 |

TABLE IV-continued

| | | | | | | | | | |
|---|---|---|---|---|---|---|---|---|---|
| Tyrin 3615P CPE | | | | | | | | | |
| F-120-F | | 30 | 8 | 8 | 8 | 8 | 8 | 8 | 8 |
| Calcium Carbonate | | | | | | | | | |
| Alumina Trihydrate | | 60 | 35 | 60 | 60 | 60 | 60 | 60 | 60 |
| Shellflex 371, Napthenic oil | | 35 | 35 | 35 | 35 | 35 | 35 | 35 | 35 |
| Calcium Stearate | | 1 | 1 | | | | | | |
| TPE Stabilizer Blend (see Table II) | | 8 | 8 | 2 | 2 | 2 | 2 | 2 | 2 |
| Araldite GT-7012, Solid Epoxy | | 3 | 3 | 3 | 3 | 3 | 3 | 3 | 3 |
| Clay | | | | 10 | 10 | 10 | 10 | 10 | 10 |
| 862507 Ultranox | | 1 | 1 | 1 | 1 | 1 | 1 | 1 | 1 |
| 877A Antioxidant | | | | | | | | | |
| SLP9053 | | 18 | | | | | | | |
| Exact 4049 | | | 27 | 66 | | 132 | 88 | 44 | |
| HP511 EVA/E/CO | | | | | | | | | 3.28 |
| Exact 4023 | | | | | | | | | |
| Limiting Oxygen Index ASTM D-2863 | % | 21 | 21 | 21 | 21 | 21 | 21 | 21 | 21 |
| Gauge | inch | 0.014 | 0.0135 | 0.011 | 0.012 | 0.014 | 0.01 | 0.01 | 0.013 |
| Elmendorf Tear ASTM D-1922 | | | | | | | | | |
| L | gms/mil | 64 | 40 | 70 | 67 | 58 | 65 | 71 | 85 |
| T | | 77 | 46 | 97 | 85 | 105 | 107 | 76 | 127 |
| Tensile Properties ASTM D-882 | | | | | | | | | |
| md | | | | | | | | | |
| Tens. Str. | psi | 2110 | 2350 | 2211 | 2843 | 1293 | 2533 | 3349 | 2791 |
| % Elongation | | 926 | 1087 | 1149 | 1025 | 1220 | 1172 | 1115 | 897 |
| % Mod | psi | 788 | 375 | 429 | 412 | 344 | 1257 | 1508 | 1483 |
| td | | | | | | | | | |
| Tens Str. | psi | 1629 | 1876 | 2141 | 2500 | 1798 | 2571 | 3067 | 2995 |
| % Elongation | | 912 | 1039 | 1114 | 1002 | 1243 | 1106 | 1019 | 954 |
| 100% Mod | psi | 336 | 247 | 367 | 330 | 682 | 1337 | 1519 | 1430 |
| Cold Crack | | | | | | | | | |
| 10 lb. Roller FS-191 Method 5874 | Degrees F. | ok @ −60° F. | ok @ −60° F. | ok @ −60° F. | ok @ −60° F. | ok @ −60° F. | ok @ −60° F. | ok @ −60° F. | ok @ −60° F. |
| Masland ASTM D-1790 | Degrees F. | ok @ −60° F. | ok @ −60° F. | ok @ −60° F. | ok @ −60° F. | ok @ −60° F. | ok @ −60° F. | ok @ −60° F. | ok @ −60° F. |
| Shore A ASTMD-2240 | | 62 | 47 | 63 | 63 | 64 | 62 | 63 | 65 |
| General Comments | | milled ok rough surface nervy | milled ok rough surface nervy | milled ok smoother | milled ok smoother | sticky and soft | milled ok | milled ok | milled ok lower hot tear strength |

| | Parts by Weight | Example | | | | |
|---|---|---|---|---|---|---|
| | | 10 | 11 | 12 | 13 | 14 |
| Exact 4033 TPE | | 110 | 66 | 110 | 110 | 66 |
| Kraton G-1651 SEB Rubber | | 40 | | 40 | 40 | |
| Tyrin 3615P CPE | | | 40 | | | 40 |
| F-120-F | | 8 | 8 | 8 | 8 | 8 |
| Calcium Carbonate | | | | | | |
| Alumina Trihydrate | | 60 | 60 | 60 | 60 | 60 |
| Shellflex 371, Napthenic oil | | 35 | 35 | 35 | 35 | |
| Calcium Stearate | | | | | | 2 |
| TPE Stabilizer Blend (see Table II) | | 2 | 2 | 2 | 2 | 2 |
| Araldite GT-7012, Solid Epoxy | | 3 | 3 | 3 | 3 | 3 |
| Clay | | 10 | 10 | 10 | 10 | 10 |
| 862507 Ultranox 877A Antioxidant | | 1 | 1 | 1 | 1 | 1 |
| SLP9053 | | | | | | |
| Exact 4049 | | | 66 | | | 66 |
| HP511 EVA/E/CO | | 9.1 | | | | |
| Exact 4023 | | | | 2.3 | 6.3 | |
| Limiting Oxygen Index ASTM D-2863 | % | 21 | 21 | 21 | 21 | 21 |
| Gauge | inch | 0.011 | 0.011 | 0.012 | 0.012 | 0.011 |
| Elmendorf Tear ASTM D-1922 | | | | | | |

TABLE IV-continued

| | | | | | | |
|---|---|---|---|---|---|---|
| L | gms/mil | 82 | 119 | 82 | 68 | 96 |
| T | | 107 | 142 | 89 | 81 | 140 |
| Tensile Properties ASTM D-882 | | | | | | |
| md | | | | | | |
| Tens. Str. | psi | 2754 | 1661 | 2470 | 2114 | 1855 |
| % Elongation | | 967 | 1178 | 1041 | 1029 | 1090 |
| % Mod | psi | 851 | 475 | 214 | 286 | 378 |
| td | | | | | | |
| Tens Str. | psi | 2136 | 1504 | 2372 | 2252 | 1768 |
| % Elongation | | 965 | 1178 | 991 | 1079 | 1093 |
| 100% Mod | psi | 360 | 342 | 341 | 151 | 138 |
| Cold Crack | | | | | | |
| 10 lb. Roller FS-191 Method 5874 | Degrees F. | ok @ −60° F. | ok @ −60° F. | ok @ −60° F. | ok @ −60° F. | ok @ −60° F. |
| Masland ASTM D-1790 | Degrees F. | ok @ −60° F. | ok @ −60° F. | ok @ −60° F. | ok @ −60° F. | ok @ −60° F. |
| Shore A ASTMD-2240 | | 62 | 65 | 66 | 66 | 74 |
| General Comments | | milled ok lower hot tear strength | Too sticky added 1.5 gms CaSt at mill | milled ok | milled ok | milled ok added 1.0 gm CaSt at mill |

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

I claim:

1. A thermoplastic elastomer composition that is processable by calendering to make films for use in automotive interiors, wallcoverings, upholstry, advertising films, and tenting which comprises a major amount of a blend of thermoplastic elastomer comprising:
   a major amount of a thermoplastic elastomer or elastomers in an amount of 60% or more by weight having a weighted average melt index of less than 6,
   a minor amount of polyolefin, in an amount of less than 30%,
   a minor amount of polymeric elastomer, and
   a filler material.

2. The composition of claim 1 wherein the composition has a limiting oxygen index value of 20 to 25.

3. The composition of claim 1 wherein the composition has a limiting oxygen index value of 22.

4. The composition of claim 1 wherein the polyolefin is polypropylene.

5. The composition of claim 1 wherein thermoplastic elastomers are present m an amount of 80% or more by weight.

6. The composition of claim 1 wherein the filler is selected from the group consisting of talc, calcium carbonate, glass fibers, glass spheres, mica, alumina trihydrate, and clay.

7. The composition of claim 1 further including processing aids.

8. The composition of claim 1 which includes at least one of stabilizers, antioxidants, ultraviolet absorbers, metal soaps, anti-static agents, lubricants, nucleators, and pigments.

9. The film of claim 1 having:
   a Shore A hardness of at least about 65 as measured according to ASTM D-2240,
   a tensile strength of at least about 1500 psi as measured according to ASTM D-882,
   a % elongation of at least about 900% as measured according to ASTM D-882, and
   a density of about 1.0 g/cc, and wherein the article is ductile at about −60° F. when measured according to ASTM D-1790 and FS 191-method 5874.

10. The film of claim 1 having:
    a Shore A hardness of at least about 60 as measured according to ASTM D-2240,
    a tensile strength of at least about 2000 psi as measured according to ASTM D-882,
    a % elongation of at least about 900% as measured according to ASTM D-882, and
    a density of about 1.0 g/cc, and wherein the article is ductile at about −60° F. when measured according to ASTM D-1790 and FS 191-method 5874.

11. The composition of claim 1 wherein the thermoplastic elastomer is a blend of (a) a copolymer of ethylene and butene and (b) a copolymer of ethylene and octene produced with a metallocene or Kaminsky catalyst and having a molecular weight distribution (Mw/Mn) which is less than or equal to 3, wherein the ehtylene-butene copolymer is present in the blend in an amount of about 10 to 40% by weight and the ethylene-octene copolymer is present in the blend in an amount of about 10 to 40% by weight, and a minor amount of a homopolymer of crystalline isotactic propylene.

12. The composition of claim 11 wherein the propylene homopolymer has a melt flow rate of about 10 to 80 dg/min at 230° C. and 2.16 kg as measured according to ASTM D-1238.

13. The composition of claim 11 wherein the blend includes at least one of a stabilizer, an antioxidant, an ultraviolet absorber, a metal soap, an anti-static agent, a lubricant, a nucleator, a pigment, a fibrous material, or a mixture thereof.

14. The composition of claim 1 wherein said thermoplastic elastomer or elastomers have a weighted average melt index of less than 3.

15. The composition of claim 1 wherein said thermoplastic elastomer or elastomers have a weighted average melt index of less than 2.

16. The composition of claim 1 wherein said polyolefin is present in an amount of 20% or less by weight based upon the weight of the polymers and elastomers.

17. The composition of claim 1 wherein said polyolefin is present in an amount of 10% or less by weight based upon the weight of the polymers and elastomers.

18. The composition of claim 1 wherein said polymeric elastomer is present in an amount of 30% or less by weight based upon the weight of the polymers and elastomers.

19. The composition of claim 1 wherein said polymeric elastomer is present in an amount of 20% or less by weight based upon the weight of the polymers and elastomers.

20. The composition of claim 1 wherein said polymeric elastomer is present in an amount of 10% or less by weight based upon the weight of the polymers and elastomers.

21. The composition of claim 1 wherein said filler material is present in an amount of 50% or less by weight based upon the weight of the polymers and elastomers.

22. The composition of claim 1 wherein said filler material is present in an amount of 40% or less by weight based upon the weight of the polymers and elastomers.

23. The composition of claim 1 wherein said filler material is present in an amount of 30% or less by weight based upon the weight of the polymers and elastomers.

24. The composition of claim 1 wherein said filler material is present in an amount of 20% or less by weight based upon the weight of the polymers and elastomers.

25. The composition of claim 1 wherein said filler material is present in an amount of 10% or less by weight based upon the weight of the polymers and elastomers.

26. A calendered thermoplastic film for use in automotive interiors, wallcoverings, upholstry, advertising films, and tenting wherein the film has a thickness of 20 mils or less and comprises a major amount of a blend of thermoplastic elastomer comprising:

a major amount of a thermoplastic elastomer or elastomers in an amount of 60% or more by weight having a weighted average melt index of less than 6, a minor amount of polyolefin, in an amount of less than 30%, a minor amount of polymeric elastomer, and a filler material.

27. The thermoplastic film of claim 26 wherein the film has a thickness of 15 mils or less.

28. The thermoplastic film of claim 26 wherein the film has a thickness of 12 mils or less.

29. The thermoplastic film of claim 26 wherein the film has a thickness of 10 mils or less.

* * * * *

UNITED STATES PATENT AND TRADEMARK OFFICE
CERTIFICATE OF CORRECTION

PATENT NO. : 6,384,123 B1  
DATED : May 7, 2002  
INVENTOR(S) : Young

It is certified that error appears in the above-identified patent and that said Letters Patent is hereby corrected as shown below:

Column 9,
Line 61, the "m" should read -- in --

Column 10,
Line 58, "ehtylene" should read -- ethylene --.

Signed and Sealed this

Fifteenth Day of July, 2003

JAMES E. ROGAN
*Director of the United States Patent and Trademark Office*